United States Patent
Lee et al.

(10) Patent No.: US 8,242,233 B2
(45) Date of Patent: *Aug. 14, 2012

(54) MANUFACTURING PROCESS FOR POLY (ARYLENE SULPHIDE)

(75) Inventors: Young Rok Lee, Seoul (KR); Il Hoon Cha, Anyang-si (KR); Jun Sang Cho, Yongin-si (KR)

(73) Assignee: SK Chemicals Co., Ltd., Gyeonggi-Do (KR)

( * ) Notice: Subject to any disclaimer, the term of this patent is extended or adjusted under 35 U.S.C. 154(b) by 10 days.

This patent is subject to a terminal disclaimer.

(21) Appl. No.: 12/310,336

(22) PCT Filed: Aug. 21, 2007

(86) PCT No.: PCT/KR2007/003982
§ 371 (c)(1),
(2), (4) Date: Feb. 18, 2009

(87) PCT Pub. No.: WO2008/023915
PCT Pub. Date: Feb. 28, 2008

(65) Prior Publication Data
US 2009/0203872 A1 Aug. 13, 2009

(30) Foreign Application Priority Data

Aug. 24, 2006 (KR) .......... 10-2006-0080338
Nov. 15, 2006 (KR) .......... 10-2006-0112835

(51) Int. Cl.
*C08G 75/00* (2006.01)
(52) U.S. Cl. .......... 528/373; 528/388
(58) Field of Classification Search .......... 528/373, 528/388
See application file for complete search history.

(56) References Cited

U.S. PATENT DOCUMENTS

| | | | |
|---|---|---|---|
| 2,513,188 A | 9/1948 | Macallum | |
| 2,583,941 A | 12/1952 | Gordon, Jr. | |
| 3,285,882 A * | 11/1966 | Pike | 528/389 |
| 3,699,087 A * | 10/1972 | Brown et al. | 528/388 |
| 4,746,758 A | 5/1988 | Rule et al. | |
| 4,786,713 A | 11/1988 | Rule et al. | |
| 4,952,671 A | 8/1990 | Fagerburg et al. | |

* cited by examiner

*Primary Examiner* — Shane Fang
(74) *Attorney, Agent, or Firm* — Abelman, Frayne & Schwab

(57) ABSTRACT

This invention relates to a method of preparing poly(arylene sulfide) (PAS) from an iodo compound and a sulfur compound, and more particularly, to a method of preparing PAS, including adding a sulfur-containing polymerization terminator when PAS is produced using an iodo compound as an intermediate. Thereby, in final PAS, the residual iodine content may be maintained at the same level or decreased and other properties may be maintained at equal or superior levels, thanks to the use of the sulfur-containing polymerization terminator, which is much lower in price than conventional polymerization terminators.

5 Claims, No Drawings

MANUFACTURING PROCESS FOR POLY (ARYLENE SULPHIDE)

TECHNICAL FIELD

The present invention relates to a method of preparing poly(arylene sulfide) (hereinafter, referred to as 'PAS'), and more particularly, to a method of preparing PAS, in which the residual iodine content in a final polymer may be maintained at the same level or decreased, with the addition of a sulfur-containing polymerization terminator, in a PAS polymerization process, unlike conventionally proposed methods.

BACKGROUND ART

Typically representative of engineering plastics, PAS has superior properties, including heat resistance, chemical resistance, flame resistance, and electrical insulation, and thus the demand therefor is increasing for use in high-temperature and corrosive environments and in the field of electronic products. This polymer is mainly used for computer parts, automobile parts, coatings for parts in contact with corrosive chemicals, and industrial fibers having chemical resistance.

In particular, PAS, which is presently commercially available, is solely exemplified by polyphenylene sulfide (hereinafter, referred to as 'PPS'). PPS is commercially produced by reacting p-dichlorobenzene (hereinafter, referred to as 'pDCB') with sodium sulfide in a polar organic solvent, such as N-methylpyrrolidone. This method is known as a Macallum process, and is based on U.S. Pat. Nos. 2,513,188 and 2,583,941. Although some other types of usable polar solvent have been proposed, only N-methylpyrrolidone is presently useful. This process is conducted using only the dichloro aromatic compound, and sodium chloride (NaCl) is produced as a byproduct.

PPS, obtained by the Macallum process, has a molecular weight of about 10,000~40,000 and a melt viscosity not higher than 3000 poise. In order to obtain a higher melt viscosity, PPS is subjected to heating to a temperature below the melting point thereof, and post-treatment (curing), in which it is brought into contact with oxygen. As such, through oxidation, crosslinking, and polymer chain extension, the melt viscosity is increased to the level required for general use.

However, PPS, obtained by such a conventional process, has the following defects.

First, because sodium sulfide is used as a sulfur source required for polymerization, a metal salt, such as sodium chloride, as a by-product, is in the polymer by large amount. Even after the resultant polymer is washed, the metal salt may remain at the level of thousands of ppm, undesirably causing the corrosion of processing equipment and problems related to a spinning process upon the manufacture of fibers, as well as an increase in the electrical conductivity of the polymer. Further, from the manufacturer's point of view, the case where sodium sulfide is used is problematic in that sodium chloride is produced as a byproduct in an amount of 52% based on the weight of the material added, and should be discarded in that state even if it is recovered, because there are no economic benefits thereof.

Second, in the post treatment, the properties of a polymer grow worse. That is, the polymer is heavily colored by oxidation and crosslinking, and becomes highly brittle, in terms of mechanical properties.

Finally, as in polymers obtained by solution polymerization, the final form of PPS is very fine power form, which decreases the apparent density thereof somewhat, making it difficult to transport such polymers, and which also causes a lot of inconvenience in the course of the processing thereof.

New processes other than the Macallum process have been disclosed in U.S. Pat. Nos. 4,746,758 and 4,786,713 and related patents. These patents refer to the production of PAS from a diiodo compound and solid sulfur, instead of the dichloro compound and metal sulfide in the conventional process, through direct heating without the use of a polar solvent. This method includes two steps of iodization and polymerization, in which the iodization allows an aryl compound and iodine to react to thus obtain a diiodo compound, and the polymerization allows the diiodo compound thus obtained to react with solid sulfur, thereby producing PAS having a high molecular weight. As such, iodine, which is in a vapor form during the reaction, is recovered, to allow it to react again with an aryl compound, and hence, iodine acts as a catalyst in practice.

This method may solve the problems of conventional processes. Because iodine is a by-product, it does not increase electrical conductivity, like the metal salt, and facilitates recovery from the reactant, thus making it easy to decrease the content thereof in a final product so that it is lower than the content of the metal salt according to the conventional process.

Also, the recovered iodine may be reused in the course of iodization, and there is almost no waste. Second, because no solvent is used in the course of polymerization, pellet products may be produced, like conventional polyester products, thereby avoiding problems related to the use of fine powder products. Finally, this method may father increase the molecular weight of final PAS, compared to the conventional process, and therefore, there is no need for post treatment that undesirably worsens properties.

However, the novel process above is notably disadvantageous because it entails the following two problems. First, in the case where iodine remains in a molecular form, it may harm the processing equipment when contained even in a small amount in a final PAS product, due to its corrosiveness. Second, because solid sulfur is used in the course of polymerization, a disulfide link is present in final PAS, undesirably deteriorating thermal properties, including the melting point.

DISCLOSURE

Technical Problem

The present inventors have been interested in the first problem mentioned above and have made an effort to solve it through chemical methods. The reason why iodine should be removed from a final polymer is strongly related to economic problems as well as its corrosiveness. According to the above-mentioned novel process, iodine may be contained in a polymer in either of the following two manners, that is, the entrapped iodine molecule ($I_2$) in polymer matrix and the binding of an iodine atom to the aryl group of a polymer. Because the former manner greatly depends on the equipment or reaction conditions for polymerization, the present invention is focused on the latter manner. In particular, the present invention is intended to use compounds other than ones used in the conventional patents.

Leading to the present invention, intensive and thorough researches carried out by the present inventors aiming so as to solve the problems encountered in the related art, resulted in the finding that a specific compound containing sulfur is much lower in price than the iodo compounds mentioned in the above patents but exhibits effects equal or superior thereto.

Thus, an aspect of the present invention is to provide a method of preparing PAS, which realizes a lower production cost and is capable of decreasing the residual iodine content in PAS effectively.

Another aspect of the present invention is to provide PAS, which has an iodine content ranging from 0.01 to 5000 ppm, a molecular weight ranging from 1,000 to 1,000,000, and a melt viscosity ranging from 1 to 500,000,000 poise, measured conventionally.

A further aspect of the present invention is to provide a molded product, obtained by molding the PAS, for example, fiber, an injection molded product, a coating product.

Technical Solution

In order to accomplish the above aspects, the present invention provides a method of preparing PAS, including adding 0.01~10.0 wt % of a sulfur-containing polymerization terminator based on the weight of PAS.

Advantageous Effects

According to the present invention, in a novel process for the polymerization of PAS from an iodo compound, when a sulfur-containing polymerization terminator, which is quite inexpensive, is used, instead of the iodo compounds specified in conventional patents, it may exhibit not only typical properties, but also an ability to terminate polymerization equal or superior thereto, effectively decreasing the production cost while the important properties of the final PAS are retained as same or better.

BEST MODE

Hereinafter, a detailed description will be given of the present invention.

As mentioned above, the present invention provides a method of preparing PAS, characterized in that a polymerization terminator, which contains sulfur and is much lower in price than other polymerization terminators disclosed in the conventional literature, is added when PAS is prepared from an iodo compound, thus decreasing the iodine content in final PAS and increasing the other properties thereof.

In the present invention, which is involved in typically polymerizing PAS from a diiodo aryl compound and a sulfur compound, as known in the conventional technique, it is noted that a polymerization terminator, improved compared to various compounds used in the conventional technique, is used. Accordingly, PAS, in particular, PPS produced from p-diiodobenzene (hereinafter, referred to as 'pDIB'), may be applied to all fields to which PPS produced through a conventional Macallum process is used.

Examples of the diiodo aryl compound used for the polymerization of PAS and derivatives thereof include, but are not limited to, diiodobenzene (DIB), diiodonaphthalene, diiodobiphenyl, diiodobisphenol, diiodobenzophenone, etc. Further, an alkyl group or a sulfone group, acting as a substituent, may be attached to the above compound, or alternatively, an atom such as oxygen or nitrogen may be contained in the aryl compound. Depending on the position of the iodine atom, various diiodo compound isomers may be formed. Particularly useful are compounds in which iodine atoms are attached symmetrically at the farthest distance from both ends of a molecule, for example, pDIB, 2,6-diiodonaphthalene, or p,p'-diiodobiphenyl.

The usable sulfur is not limited to any particular form. Typically, sulfur is present in a cyclooctasulfur form ($S_8$) in which eight sulfur atoms are connected, at room temperature. Otherwise, any form may be used as long as it is solid sulfur that is commercially available.

Specifically, PAS is polymerized in a manner such that a diiodo aryl compound and sulfur are dissolved and mixed along with a relatively small amount of additive, after which the obtained mixture is loaded into a high-temperature and low-pressure reactor, to prepare an oligomer, which is then reacted at a high temperature in a vacuum with a reaction catalyst or a polymerization terminator as needed, thereby polymerizing PAS, which has a high molecular weight.

In this reaction, there is found the fact that, in the case of a PPS homopolymer, obtained from pDIB and sulfur, the melting point thereof is increased due to the presence of the reaction catalyst. Even though the catalyst is absent in practice, the polymerization may progress reasonably. However, in the polymerization of PPS, the melting point of the polymer is drastically decreased, as in Comparative Example 1 mentioned below, undesirably causing heat resistance problems in products. So, it is very important that the reaction catalyst be appropriately selected. Examples of the reaction catalyst include, but are not limited to, 1,3-diiodo-4-nitrobenzene, 1-iodo-4-nitrobenzene, etc.

The polymerization terminator plays a role in removing iodine, which remains at the end of a PAS molecule, from the chain of the polymer. Even though the iodine molecule is removed from as many of the polymers as possible, if iodine remains at the end of the PAS molecule, it may react with a sulfur molecule, which is present in a minimum amount in the polymer. In this case, when the PAS is heated to process it, there is a probability of corroding processing machines due to the small amount of iodine discharged out of the polymer. In addition, because iodine is rather expensive, the polymerization terminator must be used in order to maximize recovery of the iodine used. Further, the polymerization terminator is responsible for preventing the viscosity of a polymer from being unusually increased during the processing. That is, it is essential to efficiently select the polymerization terminator for the polymerization of PAS.

The PAS preparation method according to the present invention is characterized in that a compound, which is much lower in price than, and has ability to terminate polymerization similar or superior to, monoiodo compounds proposed in the above-mentioned conventional techniques (in particular, U.S. Pat. No. 4,952,671), is used as the polymerization terminator.

The compounds, serving as the polymerization terminator, all contain sulfur, and may be widely used for other end applications in the related art, and thus are much lower in price than iodo compounds that are not widely used.

Such a compound may be selected from the group consisting of benzothiazoles, benzothiazolesulfenamides, thiurams, and dithiocarbamates, the common point of which has a functional group, in which nitrogen, carbon, and sulfur, in that order, are connected, in a molecule. Typical examples of this compound include, but are not limited to, 2-mercaptobenzothiazole, 2,2'-dithiobisbenzothiazole (hereinafter, abbreviated to 'MBTS'), N-cyclohexylbenzothiazole-2-sulfenamide, 2-morpholinothiobenzothiazole, N-dicyclohexylbenzothiazole-2-sulfenamide, tetramethylthiuram monosufide, tetramethylthiuram disulfide, zinc dimethyldithiocarbamate, and zinc diethyldithiocarbamate.

The polymerization terminator is used in an amount of 0.01~10.0 wt %, and preferably 0.1~5.0 wt %, based on the weight of PAS. When the amount is less than 0.01 wt %, the desired effects become insignificant in practice. On the other hand, when the amount exceeds 10 wt %, the melt viscosity does not reach a desired level in many cases.

As mentioned above, the polymerization terminator, which contains sulfur and is much lower in price than other polymerization terminators mentioned in the conventional literatures, is added, such that PAS has an iodine content ranging from 0.01 to 5,000 ppm, a molecular weight ranging from 1,000 to 1,000,000, and a melt viscosity ranging from 1 to 500,000,000 poise.

The PAS has a lower iodine content and higher properties than PAS compounds prepared through conventional methods, and therefore may be applied to the manufacture of molded products, including fibers, injection molded products, coating products, or films.

MODE FOR INVENTION

A better understanding of the present invention may be obtained through the following examples and comparative examples, which are set forth to illustrate, but are not to be construed as the limit of the present invention.

In order to evaluate the properties of polymers obtained in the examples and comparative examples, a melt viscosity (MV) was measured at 300° C. using a rotating disk viscometer, and a melting point (Tm) was measured using a differential scanning calorimeter (DSC). Further, the iodine content was determined in a manner such that a sample was burned, absorbed by a water-based solution, and then analyzed by ion chromatography.

COMPARATIVE EXAMPLE 1

300.0 g of pDEB and 29.15 g of sulfur were heated to 180° C. to thus completely dissolve and mix them, after which the temperature was increased to 220° C. and the pressure was decreased to 350 Torr. The obtained mixture was allowed to react for a total of 8 hours while the temperature and the pressure thereof were stepwisely changed to 300° C. and 1 Torr, respectively.

The produced polymer had MV of 30,500 poise, Tm of 230.1° C., and an iodine content of 3,902 ppm.

COMPARATIVE EXAMPLE 2

Polymerization was conducted under the same conditions as in Comparative Example 1, with the exception that 1.48 g of 4-iodobiphenyl was further added when pDIB and sulfur were dissolved and mixed.

The produced polymer had MV of 3,200 poise, Tm of 233.1° C., and an iodine content of 360 ppm.

EXAMPLE 1

Polymerization was conducted under the same conditions as in Comparative Example 1, with the exception that 0.96 g of zinc diethyldithiocarbamate was further added when pDIB and sulfur were dissolved and mixed.

The produced polymer had MV of 3,010 poise, Tm of 235.4° C., and an iodine content of 396 ppm.

EXAMPLE 2

Polymerization was conducted under the same conditions as in Comparative Example 1, with the exception that 0.88 g of 2,2'-dithiobisbenzothiazole (MBTS) was further added when pDIB and sulfur were dissolved and mixed.

The produced polymer had MV of 3,520 poise, Tm of 248.5° C., and an iodine content of 290 ppm.

EXAMPLE 3

Polymerization was conducted under the same conditions as in Comparative Example 1, with the exception that 1.10 g of MBTS was further added when pDIB and sulfur were dissolved and mixed.

The produced polymer had MV of 1,790 poise, Tm of 255.8° C., and an iodine content of 183 ppm.

COMPARATIVE EXAMPLE 3

Polymerization was conducted under the same conditions as in Comparative Example 1, with the exception that 0.30 g of 1,3-diiodo-4-nitrobenzene was further added when pDIB and sulfur were dissolved and mixed.

The produced polymer had MV of 38,700 poise, Tm of 254.6° C., and an iodine content of 4,265 ppm.

COMPARATIVE EXAMPLE 4

Polymerization was conducted under the same conditions as in Comparative Example 3, with the exception that 1.48 g of 4-iodobiphenyl was further added in addition to 1,3-diiodo-4-nitrobenzene when pDIB and sulfur were dissolved and mixed.

The produced polymer had MV of 3,680 poise, Tm of 254.9° C., and an iodine content of 281 ppm.

COMPARATIVE EXAMPLE 5

Polymerization was conducted under the same conditions as in Comparative Example 3, with the exception that the final period of time of the reaction at 320° C. and 1 Torr was increased by additional 3 hours.

The produced polymer had MV of 45,360 poise, Tm of 255.7° C., and an iodine content of 3,520 ppm.

COMPARATIVE EXAMPLE 6

Polymerization was conducted under the same conditions as in Comparative Example 1, with the exception that 1.32 g of 1-iodo-4-nitrobenzene was further added, instead of 1,3-diiodo-4-nitrobenzene, when pDIB and sulfur were dissolved and mixed.

The produced polymer had MV of 2,640 poise, Tm of 251.5° C., and an iodine content of 1,077 ppm.

EXAMPLE 4

Polymerization was conducted under the same conditions as in Comparative Example 3, with the exception that 0.88 g of MBTS was further added in addition to 1,3-diiodo-4-nitrobenzene, when pDIB and sulfur were dissolved and mixed.

The produced polymer had MV of 3,060 poise, Tm of 265.7° C., and an iodine content of 570 ppm.

EXAMPLE 5

Polymerization was conducted under the same conditions as in Comparative Example 3, with the exception that 1.10 g of MBTS was further added in addition to 1,3-diiodo-4-nitrobenzene when pDIB and sulfur were dissolved and mixed.

The produced polymer had MV of 1,680 poise, Tm of 266.8° C., and an iodine content of 309 ppm.

EXAMPLE 6

Polymerization was conducted under the same conditions as in Comparative Example 5, with the exception that 0.88 g of MBTS was further added in addition to 1,3-diiodo-4-nitrobenzene when pDIB and sulfur were dissolved and mixed.

The produced polymer had MV of 4,550 poise, Tm of 265.0° C., and an iodine content of 232 ppm.

EXAMPLE 7

About 3 kg of a polymer was produced under the same conditions as in Example 6, and the test piece thereof was manufactured according to ASTM D638 using an Engel ES75P injector to measure tensile strength, tensile modulus, and tensile elongation at the breaking point. The barrel temperature was set at 270° C., 300° C., and 300° C., in that order, from the inlet, and the nozzle temperature was 310° C.

As the results, the tensile strength was determined to be 11,000 psi, the tensile modulus was determined to be 850,000 psi, and the tensile elongation at the breaking point was determined to be 1.5%.

The molecular weight (MW) and price of each of the components used in the above examples and comparative examples are given in Table 1 below.

TABLE 1

|  | MW | Price (Aldrich'05 Catalog) |
|---|---|---|
| 4-Iodobiphenyl | 280.1 | 26,080 won/g (652,000 won/25 g) |
| 1-Iodo-4-Nitrobenzene | 249.0 | 86,000 won/g (652,000 won/25 g) |
| 2,2'-Dithiobisbenzothiazole (MBTS) | 332.5 | 610 won/g (61,000 won/100 g) |
| Zinc Diethyldithiocarbamate | 361.9 | 1,520 won/g (38,000 won/25 g) |

The additives used in the above examples and comparative examples and the properties of the obtained polymers are given in Table 2 below.

TABLE 2

|  | Polymerization Terminator | Reaction Catalyst | Time (hr) | MV (poise) | Tm (° C.) | Iodine (ppm) |
|---|---|---|---|---|---|---|
| C. Ex. 1 | — | — | 8 | 30500 | 230.1 | 3902 |
| C. Ex. 2 | 4-Iodobiphenyl 1.48 g | — | 8 | 3200 | 233.1 | 360 |
| Ex. 1 | Zinc Diethyldithio carbamate 0.96 g | — | 8 | 3010 | 235.4 | 396 |
| Ex. 2 | 2,2'-Dithiobisbenzo thiazole 0.88 g | — | 8 | 3520 | 248.5 | 290 |
| Ex. 3 | MBTS 1.10 g | — | 8 | 1790 | 255.8 | 183 |
| C. Ex. 3 | — | 1,3-Diiodo-4-Nitrobenzene 0.30 g | 8 | 38700 | 254.6 | 4265 |
| C. Ex. 4 | 4-Iodobiphenyl 1.48 g | 1,3-Diiodo-4-Nitrobenzene 0.30 g | 8 | 3680 | 254.9 | 281 |
| C. Ex. 5 | — | 1,3-Diiodo-4-Nitrobenzene 0.30 g | 11 | 45360 | 255.7 | 3520 |
| C. Ex. 6 | — | 1-Iodo-4-Nitrobenzene 1.32 g | 8 | 2640 | 251.5 | 1077 |
| Ex. 4 | MBTS 0.88 g | 1,3-Diiodo-4-Nitrobenzene 0.30 g | 8 | 3060 | 265.7 | 570 |
| Ex. 5 | MBTS 1.10 g | 1,3-Diiodo-4-Nitrobenzene 0.30 g | 8 | 1680 | 266.8 | 309 |
| Ex. 6 | MBTS 1.10 g | 1,3-Diiodo-4-Nitrobenzene 0.30 g | 11 | 4550 | 265.0 | 232 |

The invention claimed is:

1. A method of preparing poly(arylene sulphide), comprising:
carrying out a polymerization by reacting a diiodo aryl compound with solid sulfur as a sulfur source in the absence of solvent,
wherein a sulfur-containing polymerization terminator having a functional group in which nitrogen, carbon and sulfur are connected in order in a molecule is added in an amount of 0.01 to 10 wt % based on the poly(arylene sulfide) during the polymerization, the sulfur-containing polymerization terminator being selected from a group consisting of benzothiazoles, benzothiazolesulfenamides, thiurams, and dithiocarbamates.

2. The method according to claim 1, wherein the sulfur-containing polymerization terminator is used in an amount of 0.1-5.0 wt %.

3. The method according to claim 1, wherein the sulfur-containing polymerization terminator is selected from a group consisting of 2-mercaptobenzothiazole, 2,2'-dithiobisbenzothiazole, N-cyclohexylbenzothiazole-2-sulfenaminde, 2-morpholinothiobenzothiazole, N-dicyclohexylbenzothiazole-2-sulfenamide, tetramethylthiuram monosulfide, tetramethylthiuram disulfide, zinc dimethyldithiocarbamate, and zinc diethyldithiocarbamate.

4. The method according to claim 1, further comprising adding a reaction catalyst, along with the polymerization terminator.

5. The method according to claim 1, wherein the polymerization is carried out such that the sulfur-containing polymerization terminator is added under vacuum condition.

* * * * *